(12) United States Patent
Naito et al.

(10) Patent No.: US 10,079,948 B2
(45) Date of Patent: Sep. 18, 2018

(54) IMAGE READING APPARATUS PROVIDED WITH ORIGINAL DOCUMENT SKEW CORRECTION FUNCTION

(71) Applicant: PANASONIC INTELLECTUAL PROPERTY MANAGEMENT CO., LTD., Osaka (JP)

(72) Inventors: Takashi Naito, Fukuoka (JP); Hiroshi Kusuda, Fukuoka (JP); Takefusa Ogata, Fukuoka (JP); Katsuji Ichimaru, Saga (JP); Kenji Fukuta, Saga (JP); Terumi Tsuda, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/486,404

(22) Filed: Apr. 13, 2017

(65) Prior Publication Data

US 2017/0310839 A1 Oct. 26, 2017

(30) Foreign Application Priority Data

Apr. 26, 2016 (JP) .................................. 2016-088102
Apr. 26, 2016 (JP) .................................. 2016-088106
Apr. 26, 2016 (JP) .................................. 2016-088108

(51) Int. Cl.
*H04N 1/04* (2006.01)
*H04N 1/00* (2006.01)

(52) U.S. Cl.
CPC ..... *H04N 1/00718* (2013.01); *H04N 1/00588* (2013.01); *H04N 1/00602* (2013.01); *H04N 1/00737* (2013.01); *H04N 1/00748* (2013.01); *H04N 1/00774* (2013.01); *H04N 2201/0081* (2013.01)

(58) Field of Classification Search
CPC .......... H04N 1/00718; H04N 1/00588; H04N 1/00602; H04N 1/00737; H04N 1/00748
USPC ......................................... 358/496, 498, 48
See application file for complete search history.

(56) References Cited

U.S. PATENT DOCUMENTS

| 6,059,285 | A | * | 5/2000 | Suga | ..................... | B65H 9/002 |
|---|---|---|---|---|---|---|
| | | | | | | 271/228 |
| 6,718,071 | B2 | * | 4/2004 | Yoshida | ............... | G06K 9/3283 |
| | | | | | | 358/1.5 |
| 9,471,024 | B1 | * | 10/2016 | Nakata | ............... | G03G 15/6561 |
| 2005/0035528 | A1 | * | 2/2005 | Suga | ..................... | B65H 5/062 |
| | | | | | | 271/10.12 |
| 2008/0036137 | A1 | * | 2/2008 | Moteki | .................. | H04N 1/047 |
| | | | | | | 271/228 |

(Continued)

FOREIGN PATENT DOCUMENTS

JP 10-35949 2/1998

*Primary Examiner* — Cheukfan Lee
(74) *Attorney, Agent, or Firm* — Greenblum & Bernstein, P.L.C.

(57) ABSTRACT

According to detection results of a plurality of original document detectors, an image reading apparatus determines whether or not correcting skew of an original document is possible, controls a pair of a plurality of transport rollers in a case where it is determined that correcting the skew of the original document is possible, and corrects the skew of the original document by making transporting speeds of the pair of the plurality of transport rollers different from each other.

10 Claims, 14 Drawing Sheets

(56) References Cited

U.S. PATENT DOCUMENTS

2009/0160119 A1* 6/2009 Komuro ............... B65H 3/0684
　　　　　　　　　　　　　　　　　　　271/10.11
2011/0075168 A1* 3/2011 Ikari .................. H04N 1/00687
　　　　　　　　　　　　　　　　　　　358/1.9
2012/0262765 A1* 10/2012 Saito ........................ B65H 7/08
　　　　　　　　　　　　　　　　　　　358/488

* cited by examiner

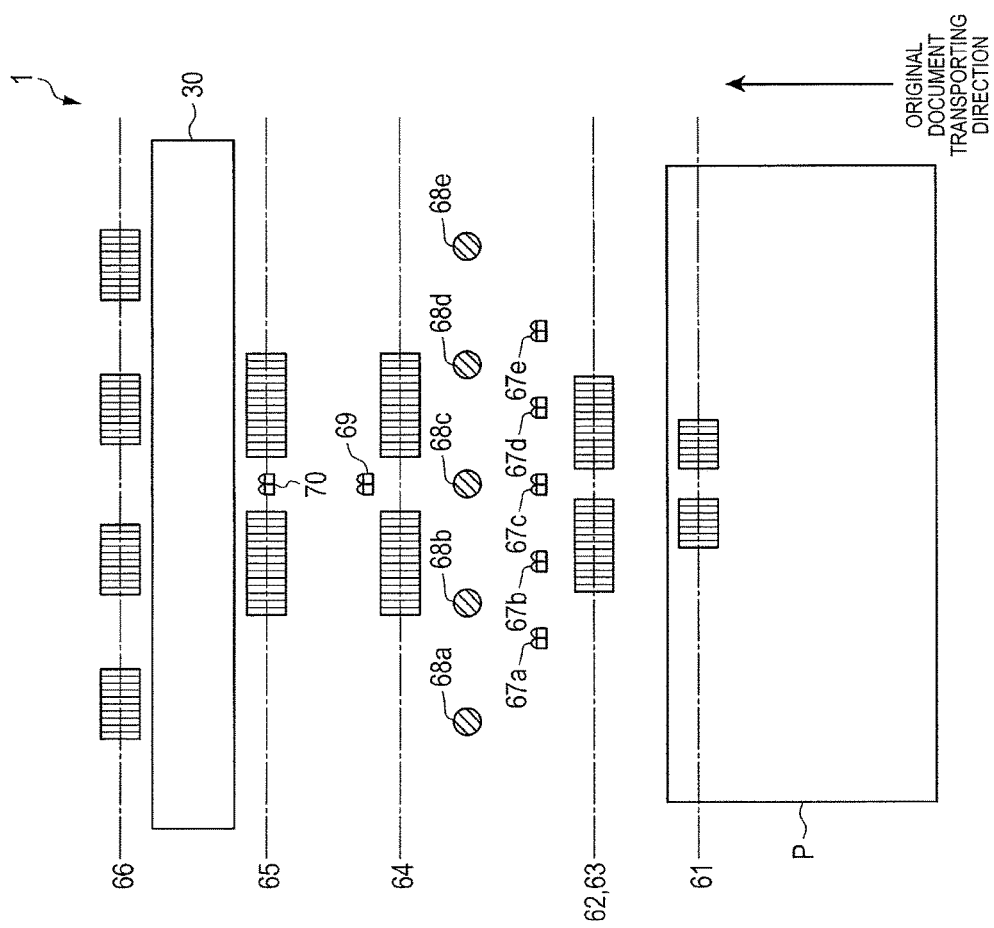

FIG. 6

| # | FIRST ORIGINAL DOCUMENT DETECTOR | | | | | SKEW CORRECTABILITY |
|---|---|---|---|---|---|---|
|   | 67a | 67b | 67c | 67d | 67e |   |
| 1 | ● | ● | ● | ● | ● | POSSIBLE |
| 2 | ● | ● | ● | ● | – | POSSIBLE |
| 3 | – | ● | ● | ● | ● | POSSIBLE |
| 4 | ● | ● | ● | ● | ○ | POSSIBLE |
| 5 | ○ | ● | ● | ● | ● | POSSIBLE |
| 6 | – | ● | ● | ● | – | POSSIBLE |
| 7 | ○ | ○ | ● | ● | ● | POSSIBLE |
| 8 | ● | ● | ● | ○ | ○ | POSSIBLE |
| 9 | ○ | ● | ● | ● | – | POSSIBLE |
| 10 | – | ● | ● | ● | ○ | POSSIBLE |
| 11 | – | ○ | ● | ● | ● | POSSIBLE |
| 12 | ● | ● | ● | ○ | – | POSSIBLE |
| 13 | ● | ● | ● | – | – | IMPOSSIBLE (LEFT NIP ONLY) |
| 14 | ● | ● | – | – | – | IMPOSSIBLE (LEFT NIP ONLY) |
| 15 | – | ● | ● | – | – | IMPOSSIBLE (LEFT NIP ONLY) |
| 16 | ● | ● | ○ | – | – | IMPOSSIBLE (LEFT NIP ONLY) |
| 17 | ○ | ● | ● | – | – | IMPOSSIBLE (LEFT NIP ONLY) |
| 18 | ○ | ○ | – | – | – | IMPOSSIBLE (RIGHT NIP ONLY) |
| 19 | – | ○ | ○ | – | – | IMPOSSIBLE (RIGHT NIP ONLY) |
| 20 | – | – | ● | ● | ● | IMPOSSIBLE (RIGHT NIP ONLY) |
| 21 | – | – | ● | ● | – | IMPOSSIBLE (RIGHT NIP ONLY) |
| 22 | – | – | – | ● | ● | IMPOSSIBLE (RIGHT NIP ONLY) |
| 23 | – | – | ● | ● | ○ | IMPOSSIBLE (RIGHT NIP ONLY) |
| 24 | – | – | ○ | ● | ● | IMPOSSIBLE (RIGHT NIP ONLY) |
| 25 | – | – | ○ | ○ | – | IMPOSSIBLE (RIGHT NIP ONLY) |
| 26 | – | – | – | ○ | ○ | IMPOSSIBLE (RIGHT NIP ONLY) |
| 27 | ● | ● | ○ | ○ | – | IMPOSSIBLE (UNKNOWN SKEW ANGLE) |
| 28 | – | ● | ● | ○ | ○ | IMPOSSIBLE (UNKNOWN SKEW ANGLE) |
| 29 | ○ | ○ | ● | ● | – | IMPOSSIBLE (UNKNOWN SKEW ANGLE) |
| 30 | – | ○ | ○ | ● | ● | IMPOSSIBLE (UNKNOWN SKEW ANGLE) |
| 31 | – | ● | ● | ○ | – | IMPOSSIBLE (UNKNOWN SKEW ANGLE) |
| 32 | – | ○ | ● | ● | – | IMPOSSIBLE (UNKNOWN SKEW ANGLE) |
| 33 | ○ | – | – | – | – | IMPOSSIBLE (UNKNOWN SKEW ANGLE) |
| 34 | – | ○ | – | – | – | IMPOSSIBLE (UNKNOWN SKEW ANGLE) |
| 35 | – | – | ○ | – | – | IMPOSSIBLE (UNKNOWN SKEW ANGLE) |
| 36 | – | – | – | ○ | – | IMPOSSIBLE (UNKNOWN SKEW ANGLE) |
| 37 | – | – | – | – | ○ | IMPOSSIBLE (UNKNOWN SKEW ANGLE) |

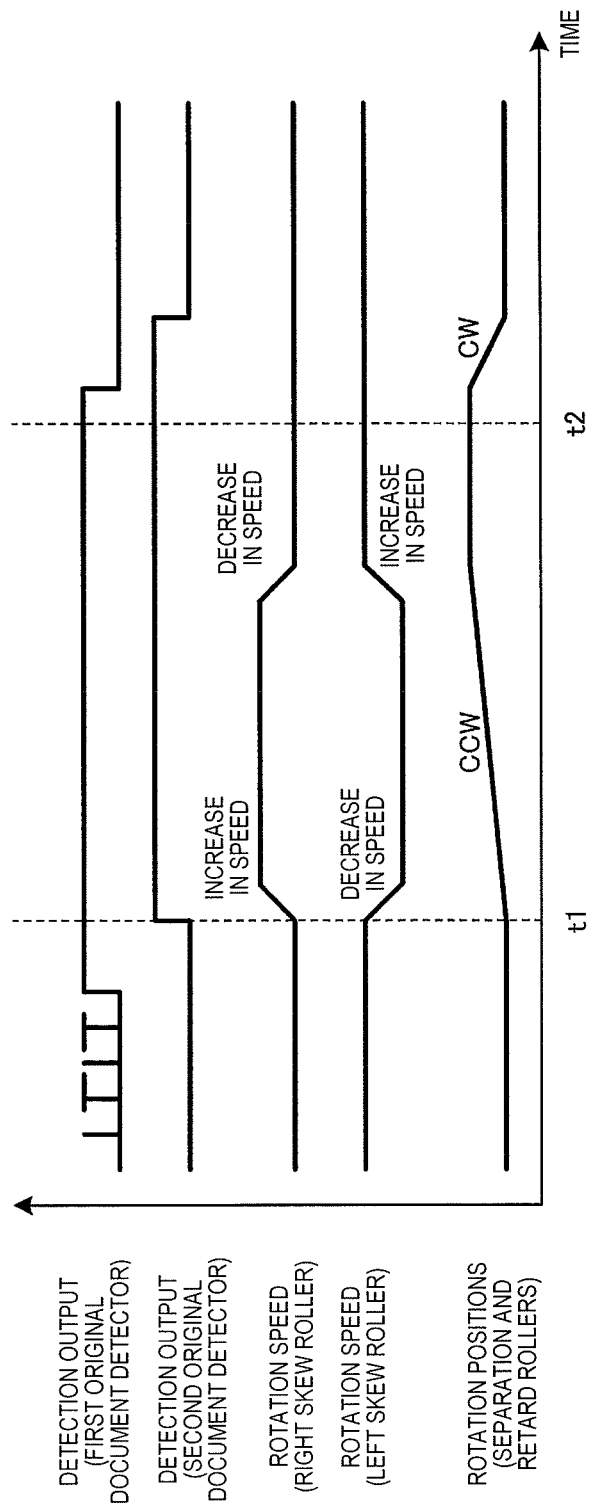

IMAGE READING APPARATUS PROVIDED WITH ORIGINAL DOCUMENT SKEW CORRECTION FUNCTION

BACKGROUND

1. Technical Field

The disclosure relates to an image reading apparatus that corrects skew of an original document.

2. Description of the Related Art

In the related art, an image reading apparatus that transports an original document, which is loaded on an original document loaded stand (paper feeding tray), one by one to an original document transport path and outputs the original document to an original document output (paper output tray) after an image formed on the original document is read by an image reader disposed in the original document transport path is known.

Such an image reading apparatus corrects a skew state (skew angle) of the original document transported to the image reader using skew correcting means to ensure that original document reading processing is precisely performed by the image reader. For example, as written in Japanese Patent Unexamined Publication No. 10-35949, an active type of skew correcting means that corrects skew while transporting an original document with the original document being pinched is used as the skew correcting means in many cases.

The active type of skew correcting means is configured of a pair of two skew rollers (resist rollers) on the right and the left that is provided at the same position in a transporting direction of an original document. Each of the pair of two skew rollers is driven by separate motors. Then, the skew correcting means corrects a skew state of the original document by changing (that is, causing a transporting speed difference between the pair of two skew rollers to occur) the transporting speed of one of the pair of skew rollers according to the skew angle of the original document while the pair of two skew rollers transports the original document with the original document being pinched therebetween.

However, there is a problem of a case where only one of the pair of two skew rollers can nip the original document or skew of the original document cannot be accurately corrected for a cause such as an excessively large skew amount of the original document, depending on the size and skew state of the original document. When it is attempted to forcibly correct the skew in a case where the skew of an original document cannot be accurately corrected, the skew amount of the original document might rather become greater or the original document might be creased.

SUMMARY

An object of the disclosure is to provide an image reading apparatus capable of preventing occurrence of a defect caused by forcibly correcting skew of an original document.

There is provided an image reading apparatus of the disclosure that transports an original document loaded on an original document loaded stand through an original document transport path and reads an image formed on the original document, the image reading apparatus including a pair of a plurality of transport rollers that is disposed at an interval in an original document width direction, which is orthogonal to a transporting direction of the original document, and transports the original document with the original document being pinched therebetween, a plurality of original document detectors that are disposed at an interval in the original document width direction on an upstream side of the pair of transport rollers in the transporting direction and detect passing of the original document, a determiner that determines whether or not correcting skew of the original document is possible based on detection results of the plurality of original document detectors, and a controller that controls the pair of the plurality of transport rollers and corrects the skew of the original document by making transporting speeds of the pair of the plurality of transport rollers different from each other, in a case where the determiner determines that correcting the skew of the original document is possible.

According to the disclosure, occurrence of a defect caused by forcibly correcting skew of an original document can be prevented.

BRIEF DESCRIPTION OF THE DRAWINGS

FIG. 4 is a top sectional view of the image reading apparatus in the exemplary embodiment;

FIG. 6 is a table showing a relationship between a detection result of the first original document detector and skew correctability;

FIG. 11 is a timing chart of each parameter when correcting the skew of the original document;

DETAILED DESCRIPTION

Figure 1:
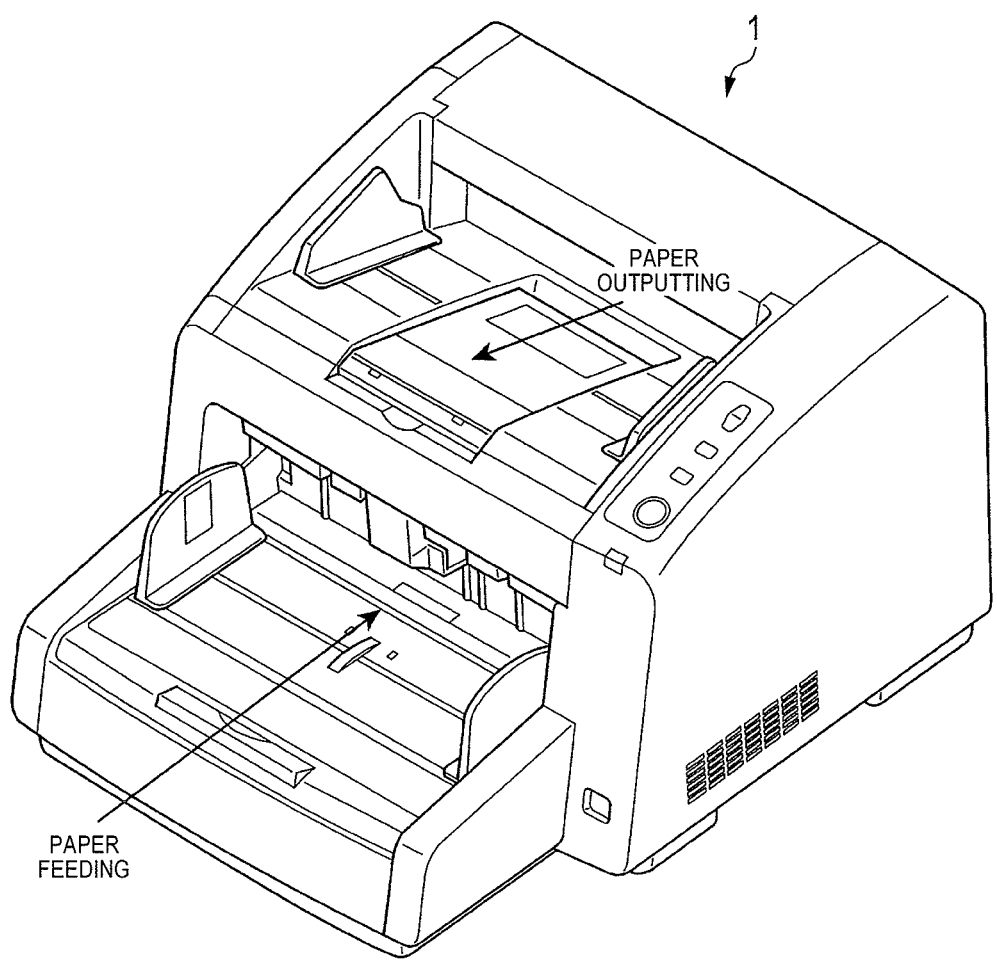
FIG. 1 is an overall perspective view of an image reading apparatus in the exemplary embodiment.
Figure 2:
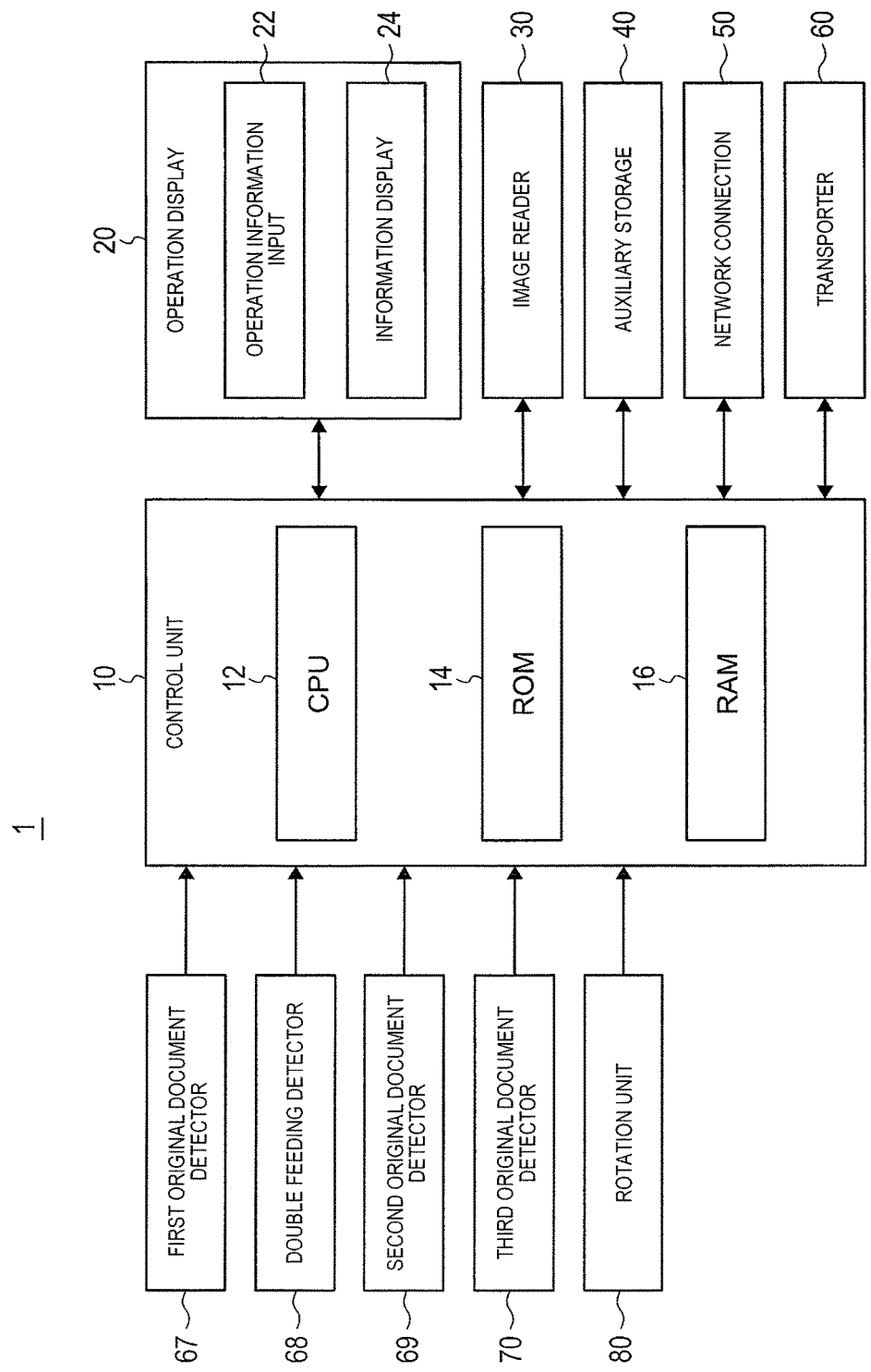
FIG. 2 is a block diagram illustrating a functional configuration of the image reading apparatus in the exemplary embodiment.
Figure 3:
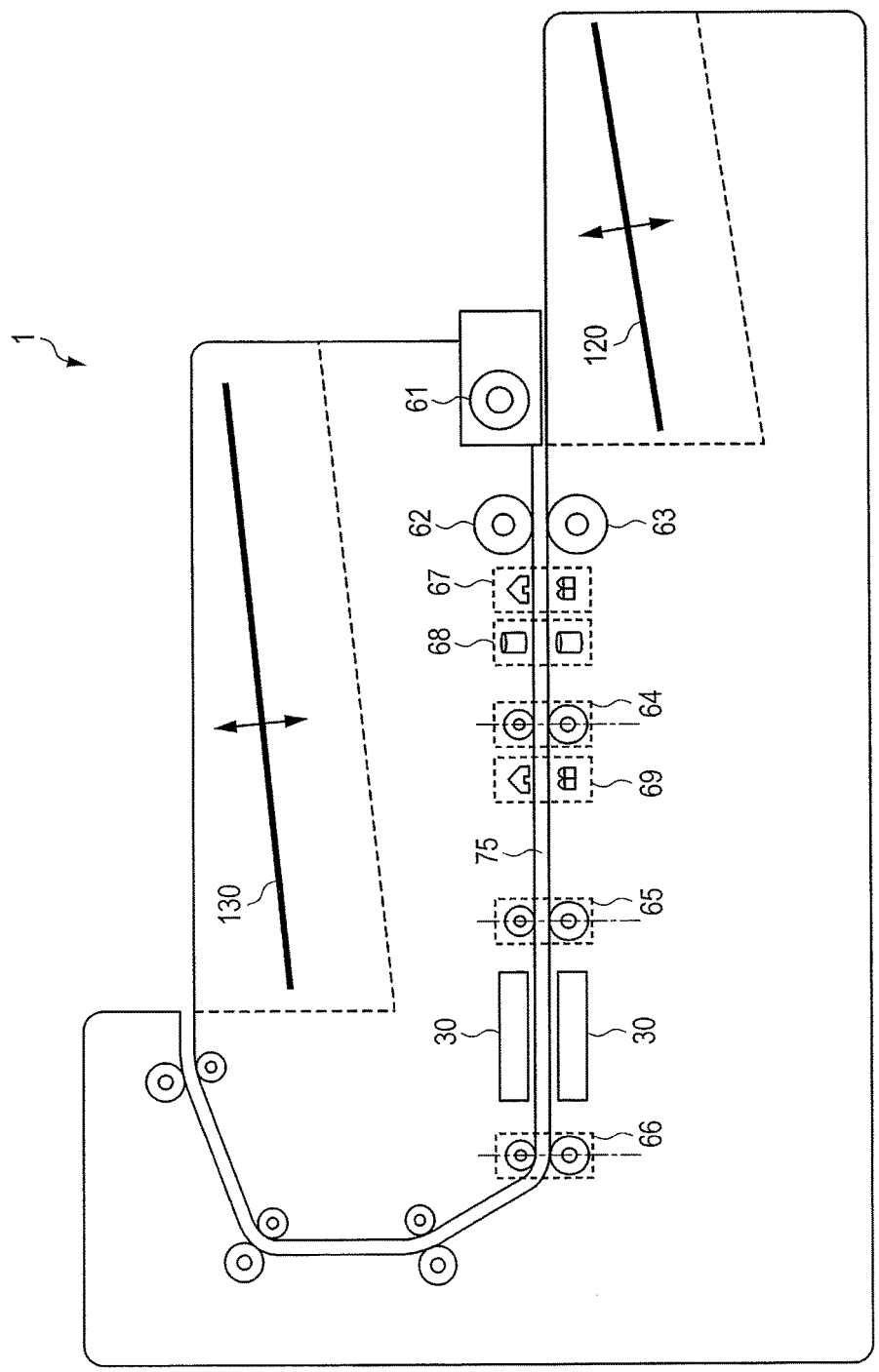
FIG. 3 is a side sectional view of the image reading apparatus in the exemplary embodiment.

Hereinafter, the exemplary embodiment will be described in detail with reference to the drawings. FIG. 1 is an overall perspective view when image reading apparatus 1 of the exemplary embodiment is seen from an apparatus front side and from above. FIG. 2 is a block diagram illustrating a functional configuration of image reading apparatus 1. FIG. 3 is a side sectional view of image reading apparatus 1. FIG. 4 is a top sectional view of image reading apparatus 1.

Image reading apparatus 1 is a document scanner, transports (paper feeding) an original document loaded on original document loaded stand 120 one by one to original document transport path 75, and outputs (paper outputting) the original document to original document output 130 after reading an image formed on the original document with image reader 30 disposed on original document transport path 75. Image reading apparatus 1 may be applied to an electrographic image forming apparatus.

As illustrated in FIG. 2, image reading apparatus 1 is provided with control unit 10, operation display 20, image reader 30, auxiliary storage 40, network connection 50, transporter 60, first original document detector 67, double feeding detector 68, second original document detector 69, third original document detector 70, and rotation unit 80.

Control unit 10 is provided with central processing unit (CPU) 12, read only memory (ROM) 14 that stores a control program (corresponding to a "skew correction control program" of the disclosure), a working memory such as RAM (random access memory) 16. CPU 12 reads the control program from ROM 14 to develop the program on RAM 16 and intensively controls operation of each block of image reading apparatus 1 in cooperation with the developed control program. At this time, CPU 12 refers to various types of data stored in auxiliary storage 40. Auxiliary storage 40 is configured of, for example, a nonvolatile semiconductor memory (so-called flash memory) and a hard disk drive. Control unit 10 functions as a "determiner" and a "controller" of the disclosure.

Control unit 10 transmits and receives various types of data to and from external devices (for example, a personal computer) connected to a communication network, including a local area network (LAN) and a wide area network (WAN), via network connection 50. Control unit 10 transmits the image read by image reader 30 to the external devices (for example, a personal computer). Network connection 50 is configured of, for example, a communication control card, including a LAN card.

Image reader 30 optically reads the image formed on the original document transported through original document transport path 75 and photoelectrically converts the image to output to control unit 10 as image data. Specifically, image reader 30 irradiates the original document with light from an exposure lamp and receives the reflected light with a light receiving surface of a solid-state imaging element, including a charge coupled device (CCD), to photoelectrically convert the reflected light via an imaging lens. In the exemplary embodiment, image reader 30 is capable of reading images formed on both sides (front side and back side) of the original document at once as illustrated in FIG. 3.

Operation display 20 functions as operation information input 22 and information display 24. Operation information input 22 is provided with various types of operation keys, including a ten key and a start key, and receives various types of operation input by a user to output an operation signal to control unit 10. Information display 24 displays various types of operation screens and an operation status of each function in accordance with a display control signal which is input from control unit 10.

Transporter 60 is provided with a plurality of pairs of transport rollers, which transport the original document on original document transport path 75, original document loaded stand 120, and original document output 130. Original document loaded stand 120 and original document output 130 are configured to be capable of rising and falling according to the number of loaded original documents.

As illustrated in FIGS. 3 and 4, paper feeding roller 61, separation and retard rollers 62 and 63 (function as a "pair of second transport rollers" of the disclosure), first original document detector 67 (functions as an "original document detector" of the disclosure), double feeding detector 68, a pair of skew rollers 64 (functions as the "pair of transport rollers" of the disclosure), second original document detector 69, a pair of transport rollers 65, third original document detector 70, image reader 30, and a pair of transport rollers 66 are disposed on original document transport path 75 from an upstream side in a transporting direction of an original document.

The original document loaded on original document loaded stand 120 is drawn in between separation roller 62 and retard roller 63 by paper feeding roller 61. The original document drawn in between separation roller 62 and retard roller 63 is separated and sent out one by one and is transported to the pair of skew rollers 64. Furthermore, the original document is transported to image reader 30 at a constant speed by the pairs of skew and transport rollers 64 and 65. Image reader 30 reads images formed on the front side and the back side of the original document. After then, the original document is output to original document output 130 by the pair of transport rollers 66 and a pair of paper outputting rollers.

Image reading apparatus 1 has a function of correcting a skew state (orientation) of the original document transported to image reader 30 using skew correcting means to ensure that original document reading processing is precisely performed by image reader 30. The pair of skew rollers 64, which is an active type of roller correcting skew while transporting an original document with the original document being pinched therebetween, is used as the skew correcting means.

As illustrated in FIG. 4, the pair of skew rollers 64 is disposed at an interval in an original document width direction orthogonal to the transporting direction of the original document and is configured of left skew roller 64a and right skew roller 64b that transport the original document with the original document being pinched therebetween. Each of left skew roller 64a and right skew roller 64b is rotation-driven by separate drive motors (not illustrated) controlled by control unit 10.

First original document detector 67 that detects passing of the original document is disposed on an upstream side of the pair of skew rollers 64 and on a downstream side of separation and retard rollers 62 and 63 in the transporting direction of the original document. As illustrated in FIG. 4, first original document detector 67 is disposed at an interval in the original document width direction and is configured of a plurality of (five) first original document detectors 67a, 67b, 67c, 67d, and 67e that detect passing of a predetermined place (the left, the middle, and the right) of the original document in the original document width direction.

Second original document detector 69 that detects passing of a predetermined place (the middle) of the original document in the original document width direction is disposed on a downstream side of the pair of skew rollers 64 and an upstream side of the pair of transport rollers 65 in the transporting direction of the original document. In addition, third original document detector 70 that detects passing of a predetermined place (the middle) of the original document in the original document width direction is disposed at the same position as that of the pair of transport rollers 65 in the transporting direction of the original document.

Control unit 10 detects the skew state (skew angle) of the original document transported to image reader 30 based on detection results (more specifically, timing at which a leading end of the original document passes) of first original document detectors 67a, 67b, 67c, 67d, and 67e. Then, when the original document is transported by left skew roller 64a and right skew roller 64b with the original document being pinched therebetween, control unit 10 corrects the skew state of the original document by changing the transporting speeds (rotating speeds) of left skew roller 64a and right skew roller 64b and causing a transporting speed difference between left skew roller 64a and right skew roller 64b to occur according to a detected angle of the original document in the skew state. In the exemplary embodiment, control unit 10 changes the rotating speeds of left skew roller 64a and right skew roller 64b such that the skew state of the original document is corrected during time from when passing of the original document is detected by second original document detector 69 to when the passing of the original document is detected by third original document detector 70. Control unit 10 may change only one of the transporting speeds of left skew roller 64a and right skew roller 64b and cause a transporting speed difference between left skew roller 64a and right skew roller 64b to occur.

Double feeding detector 68 that detects double feeding of the original document is disposed on the upstream side of the pair of skew rollers 64 and on a downstream side of first original document detector 67 in the transporting direction of the original document. As illustrated in FIG. 4, double feeding detector 68 is configured of a plurality of (five) double feeding detectors 68a, 68b, 68c, 68d, and 68e disposed at an interval in the original document width direction. In the exemplary embodiment, double feeding detectors 68a, 68b, 68c, 68d, and 68e are, for example, ultrasonic sensors or laser radars.

To describe specifically, double feeding detector 68 has a transmitter and a receptor that oppose each other via original document transport path 75 and detects whether or not an original document is double-fed according to the received strength of the receptor with respect to an ultrasonic pulse normally transmitted by the transmitter. In a case where the original document does not exist between the transmitter and the receptor, the ultrasonic pulse is mostly not attenuated and reaches the receptor (received strength is maximum). In a case where one original document exists, the ultrasonic pulse is absorbed into the original document and the received strength is attenuated. On the other hand, in a case (that is, a case where a plurality of overlapped original documents are transported) where a plurality of original documents exist, vibration energy is greatly offset and the received strength is remarkably attenuated by the ultrasonic pulse transmitted from the transmitter being more greatly absorbed and by causing a plurality of number of times of reflection within the original document. As in the above description, when the receptor receives the ultrasonic pulse transmitted from the transmitter, double feeding detector 68 detects that the original document is double-fed in a case where the signal intensity of the ultrasonic pulse is greatly attenuated. It may be configured that a threshold of received strength for detecting whether or not the original document is double-fed can be set at the user's discretion.

Meanwhile, in the aforementioned image reading apparatus 1, depending on the size and skew state of the original document, there is a case where only one of the two skew rollers, one being left skew roller 64a and the other being right skew roller 64b, can nip the original document or skew of the original document cannot be accurately corrected for a cause such as an excessively large skew amount of the original document. When it is attempted to forcibly correct the skew in a case where the skew of an original document cannot be accurately corrected, the skew amount of the original document might rather become greater or the original document might be creased.

Meanwhile, in the exemplary embodiment, based on the detection results of first original document detectors 67a, 67b, 67c, 67d, and 67e, control unit 10 determines whether or not correcting the skew of the original document is possible and corrects the skew of the original document by making the transporting speeds of left skew roller 64a and right skew roller 64b different from each other only in a case where it is determined that correcting the skew of the original document is possible.

Figure 5A:
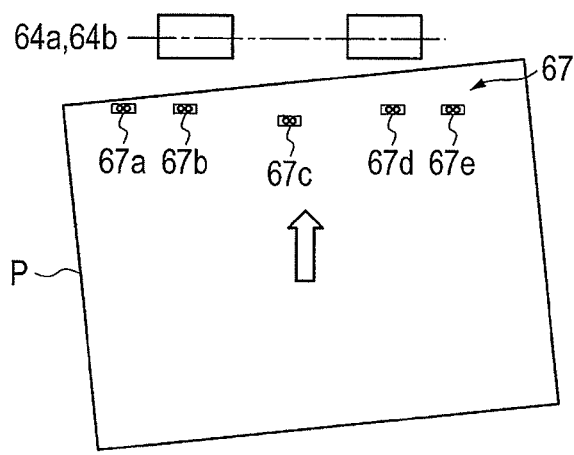
FIGS. 5A to 5C are views illustrating a pattern of detection of a first original document detector.
Figure 5B:
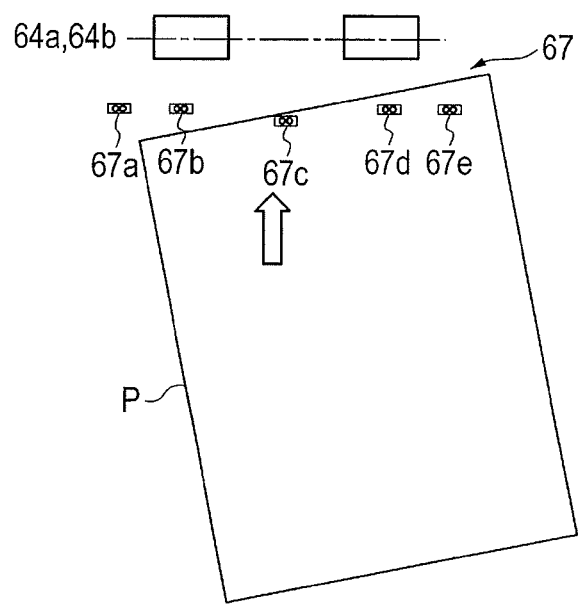
Figure 5C:
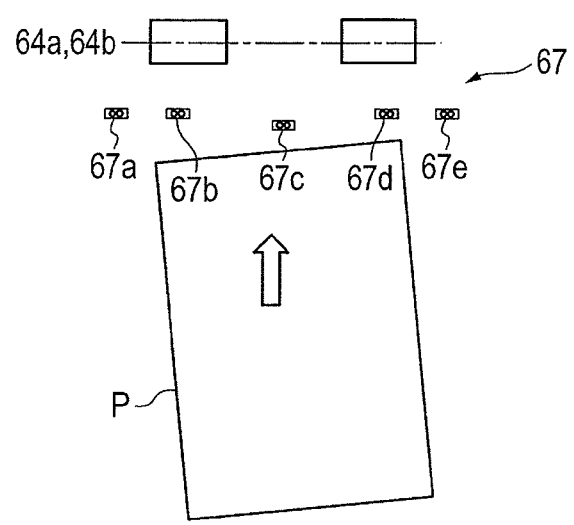

FIGS. 5A to 5C are views illustrating a pattern of detection of first original document detector 67. Specifically, FIG. 5A illustrates a case where the size of original document P, which is put horizontally, is A5 and passing of a leading end of the original document is detected by first original document detectors 67a, 67b, 67c, 67d, and 67e. FIG. 5B illustrates a case where the size of the original document, which is put vertically, is A5 and passing of a leading end of the original document is detected by first original document detectors 67b, 67c, 67d, and 67e. FIG. 5C illustrates a case where the size of the original document, which is put vertically, is A6 and passing of a leading end of the original document is detected by first original document detectors 67b, 67c, and 67d.

FIG. 6 is a table showing a relationship between detection results of first original document detectors 67a, 67b, 67c, 67d, and 67e and skew correctability. In the table shown in FIG. 6, each of #1 to 37 shows the relationship between the detection results of first original document detectors 67a, 67b, 67c, 67d, and 67e and skew correctability. A "white circle" or a "black circle" indicates that the passing of the leading end of the original document was detected as a detection result of first original document detectors 67a, 67b, 67c, 67d, and 67e and a "dash" indicates that passing of the leading end of the original document was not detected. In particular, the "black circle" indicates that the passing of the original document was detected by three or more adjacent first original document detectors 67 in order of being disposed in the original document width direction. For example, as for #11, the passing of the original document was detected by first original document detectors 67b, 67c, 67d, and 67e and was particularly detected by three or more adjacent first original document detectors 67c, 67d, and 67e in order (for example, in order of first original document detector 67c→67d→67e) of being disposed in the original document width direction.

As shown in #1 to 12, control unit 10 determined that correcting the skew of the original document was possible in a case where the passing (in other words, being pinched between left skew roller 64a and right skew roller 64b) of the original document was detected by first original document detectors 67b, 67c, and 67d, which were in the middle in the transporting direction of the original document, and the passing of the original document was detected (in other words, detecting that the leading end of the original document is formed in a straight line at a certain skew angle) by three or more adjacent first original document detectors 67 in order of being disposed in the original document width direction. Then, control unit 10 calculated the skew angle of the original document according to a difference in detection timing of first original document detectors 67 positioned at both ends out of three or more first original document detectors 67 corresponding to the "black circle". For example, in a case of #4, control unit 10 calculated the skew angle of the original document according to a difference in detection timing of first original document detectors 67a and 67d positioned at both ends out of three or more first original document detectors 67a, 67b, 67c, and 67d corresponding to the "black circle".

On the other hand, in a case of a pattern of detection shown in #13 to 26, control unit 10 determined that correcting the skew of the original document was impossible since the original document was nipped by only one of left skew roller 64a and right skew roller 64b. In addition, in a case of a pattern of detection shown in #27 to 37, control unit 10 determined that correcting the skew of the original document was impossible since the passing of the original document was not detected by three or more adjacent first original document detectors 67 in order of being disposed in the original document width direction and the skew angle of the original document was unknown. Information corresponding to the table shown in FIG. 6 is prepared from, for example, a preliminary examination and is stored in auxiliary storage 40 as electronic information.

Figure 7:
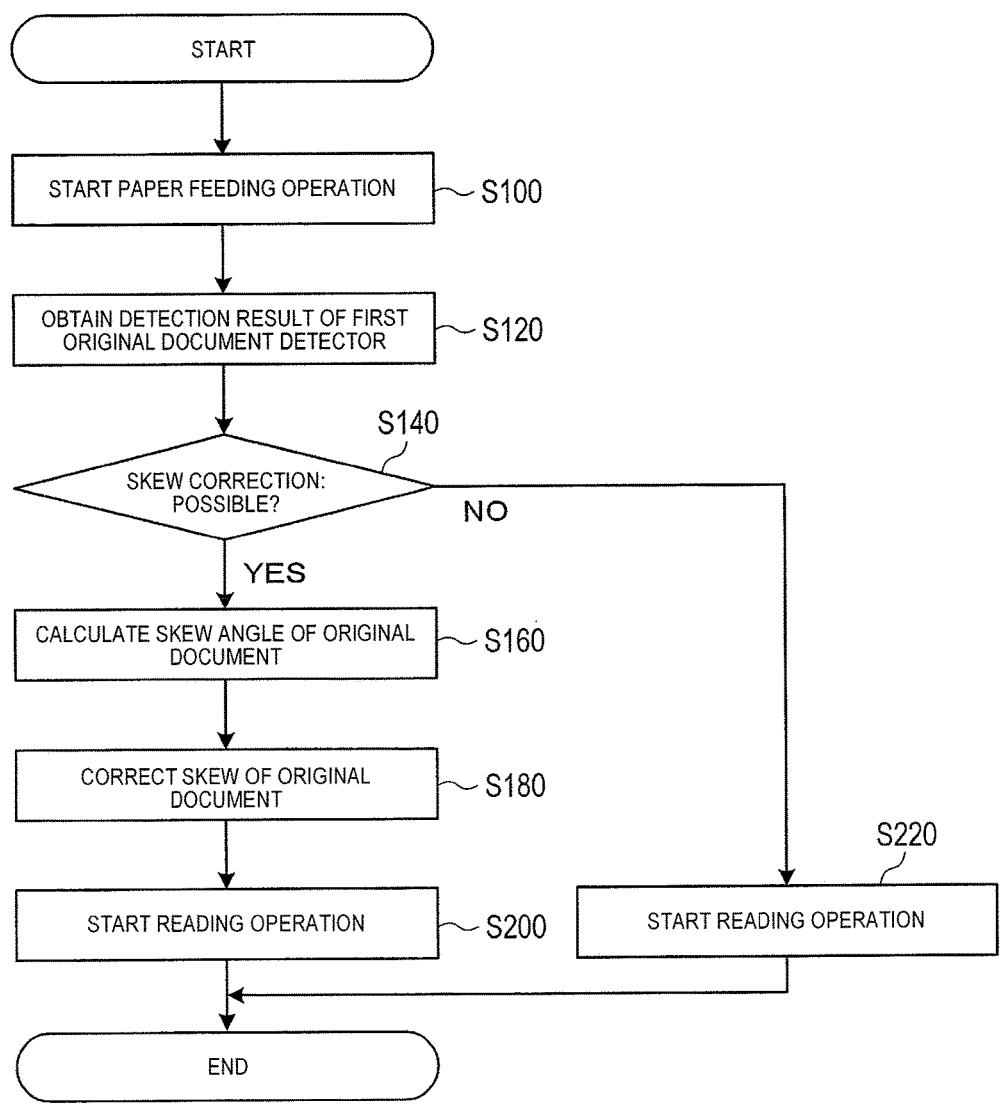
FIG. 7 is a flow chart showing skew correction control operation in the exemplary embodiment.

FIG. 7 is a flow chart showing skew correction control operation of image reading apparatus 1 in the exemplary embodiment. Processing of Step S100 in FIG. 7 starts by a power supply of image reading apparatus 1 being turned on and by original document P being loaded on original document loaded stand 120.

First, control unit 10 controls transporter 60 (paper feeding roller 61) to start paper feeding operation of original document P loaded on original document loaded stand 120 (Step S100). Next, control unit 10 obtains detection results of first original document detectors 67a, 67b, 67c, 67d, and 67e (Step S120).

Next, control unit 10 determines whether or not correcting the skew of the original document is possible based on the detection results of first original document detectors 67a, 67b, 67c, 67d, and 67e (Step S140). In a case where correcting the skew of the original document is turned out to be impossible (Step S140, NO) as a result of determination, control unit 10 controls image reader 30 to start reading operation of an image formed on the original document without correcting the skew of the original document (in other words, without making the transporting speeds of left skew roller 64a and right skew roller 64b different from each other) (Step S220). At this time, control unit 10 sets, for example, a reading region larger than usual and corrects the image read by image reader 30 using a known technique (for example, cropping and edge detecting). By completing processing of Step S220, image reading apparatus 1 terminates processing of FIG. 7.

On the other hand, in a case where correcting the skew of the original document is possible (Step S140, YES), control unit 10 calculates the skew angle of the original document according to the detection result of first original document detector 67 (Step S160). Next, control unit 10 corrects the skew of the original document by making the transporting speeds of left skew roller 64a and right skew roller 64b different from each other according to the calculated skew angle (Step S180).

Finally, control unit 10 controls image reader 30 to start the reading operation of the image formed on the original document (Step S200). By completing processing of Step S200, image reading apparatus 1 terminates processing of FIG. 7.

As described in detail hereinbefore, in the exemplary embodiment, based on the detection results of the plurality of first original document detectors 67, image reading apparatus 1 determines whether or not correcting skew of an original document is possible and controls transporter 60 to correct the skew of the original document by making the transporting speeds of left skew roller 64a and right skew roller 64b different from each other in a case where it is determined that correcting the skew of the original document is possible.

According to the exemplary embodiment configured in such a manner, the skew is prevented from being forcibly corrected in a case where the skew of the original document cannot be accurately corrected. Therefore, occurrence of a defect caused by forcibly correcting the skew of the original document (for example, the skew amount of the original document rather becomes greater or the original document is creased) can be prevented.

Figure 8A:
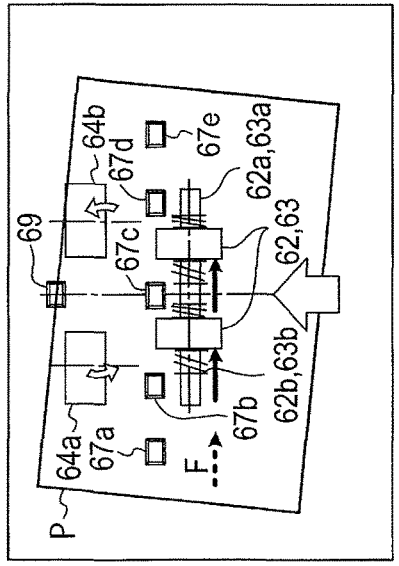
FIGS. 8A to 8C are views illustrating appearance of correcting skew of an original document.
Figure 8B:
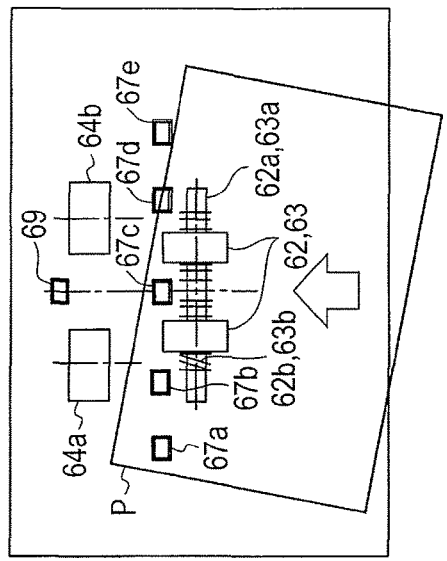
Figure 8C:
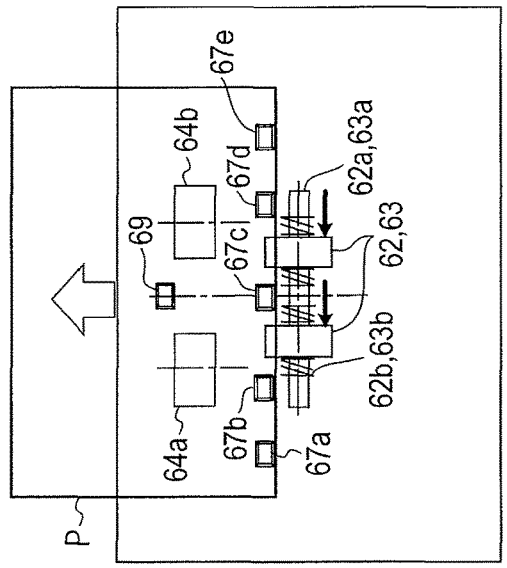

In the exemplary embodiment described above, separation and retard rollers 62 and 63 may be configured so as to be movable in the original document width direction such that a load, which is applied to the original document in response to operation of correcting the skew of the original document, decreases. As illustrated in FIGS. 8A to 8C, elastic members 62b and 63b (spring members) are mounted on rotary shafts 62a and 63a of separation and retard rollers 62 and 63.

FIG. 8A illustrates appearance in which original document P is transported in a state of being skewed and the passing of the leading end of the original document P is detected by first original document detectors 67a, 67b, 67c, 67d, and 67e. In this stage, separation and retard rollers 62 and 63 are positioned at basic positions (equal positions in the transporting direction of the original document) in the original document width direction.

FIG. 8B illustrates appearance in which control unit 10 changes (specifically, decreases the transporting speed of left skew roller 64a and increases the transporting speed of right skew roller 64b) the transporting speeds of left skew roller 64a and right skew roller 64b to correct the skew state of the original document based on the detection results of first original document detectors 67a, 67b, 67c, 67d, and 67e. At this time, as a transporting speed difference between left skew roller 64a and right skew roller 64b occurs, load F is generated in the original document width direction (right direction in FIG. 8B) in response to the counterclockwise rotation of original document P. Then, separation and retard rollers 62 and 63 are moved by load F in the original document width direction (right direction in FIG. 8B) to positions at which elastic force of elastic members 62b and 63b and load F are in balance in rotary shafts 62a and 63a. Accordingly, rotational load of original document P when correcting the skew of original document P can be decreased and skew correction performance can be improved. In addition, original document P is prevented from being creased in response to the rotation of original document P when correcting the skew of original document P.

FIG. 8C illustrates appearance after a trailing end of original document P has passed first original document detectors 67a, 67b, 67c, 67d, and 67e. At this time, as a result of original document P being released from load F, separation and retard rollers 62 and 63 move in the original document width direction (left direction in FIG. 8C) to the basic positions in rotary shafts 62a and 63a.

Figure 9:
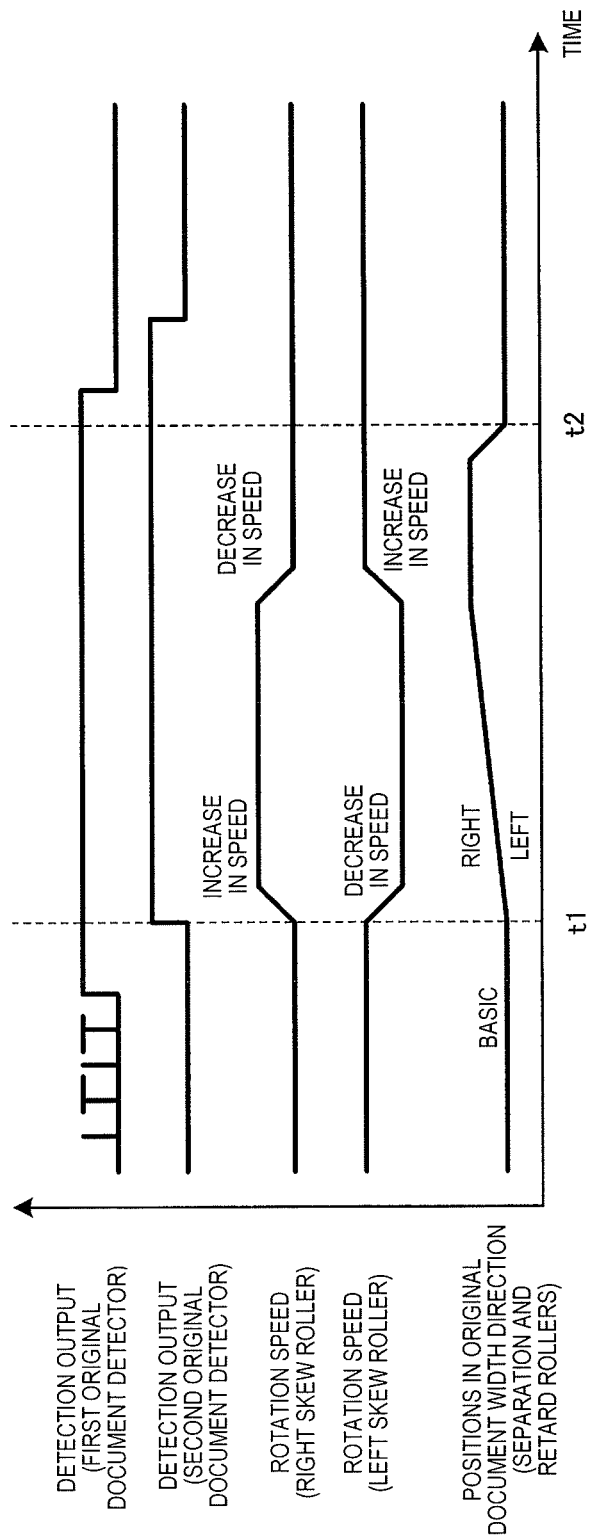
FIG. 9 is a timing chart of each parameter when correcting the skew of the original document.

FIG. 9 is a timing chart of each parameter at a time of the skew correction described with reference to FIGS. 8A to 8C. As illustrated in FIG. 9, the transporting speeds of left skew roller 64a and right skew roller 64b are changed from timing (time t1) at which second original document detector 69 detects passing of original document P and separation and retard rollers 62 and 63 move in the original document width direction to the positions at which the elastic force of elastic members 62b and 63b and load F are in balance in rotary shafts 62a and 63a. After then, separation and retard rollers 62 and 63 move (return) in the original document width direction to the basic positions in rotary shafts 62a and 63a at timing (time t2) immediately before the trailing end of original document P passes first original document detectors 67a, 67b, 67c, 67d, and 67e.

Figure 10B:
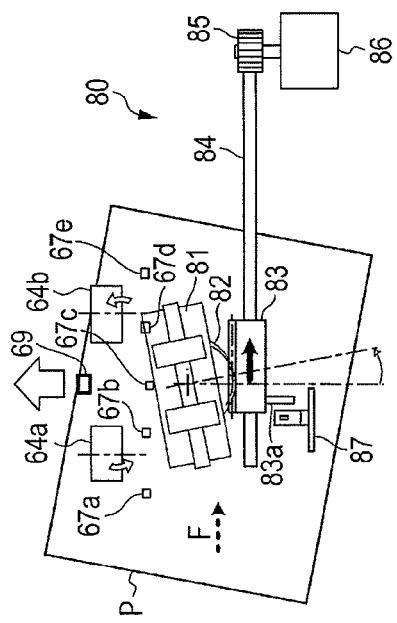
FIGS. 10A to 10C are views illustrating the appearance of correcting the skew of the original document.
Figure 10A:
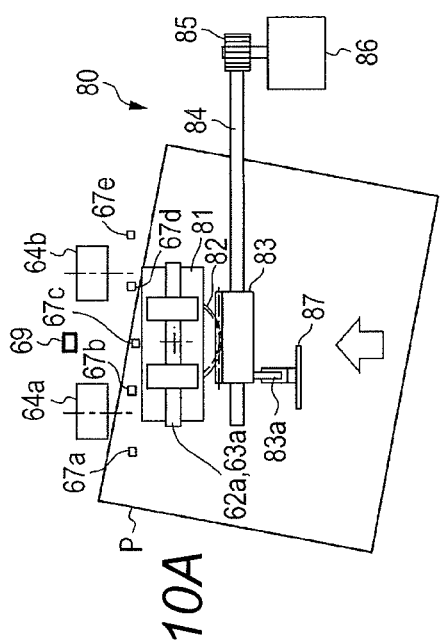
Figure 10C:
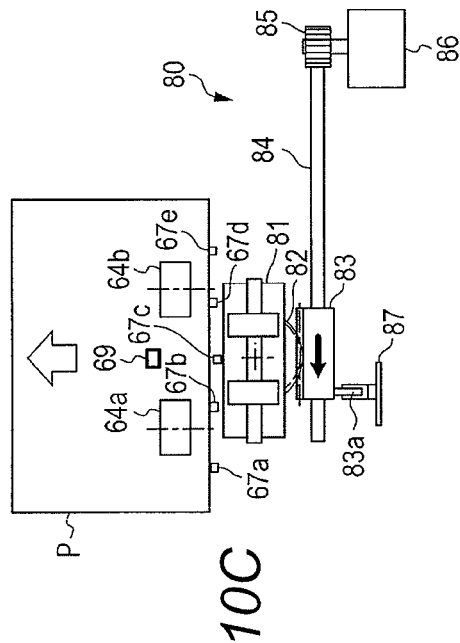

In addition, in the exemplary embodiment, rotation unit 80 may be controlled and rotary shafts 62a and 63a of separation and retard rollers 62 and 63 may be rotated such that the load, which is applied to the original document in response to the operation of correcting the skew of the original document, decreases when correcting the skew of the original document by making the transporting speeds of left skew roller 64a and right skew roller 64b different from each other. As illustrated in FIGS. 10A to 10C, rotation unit 80 is provided with holder 81, pinion gear 82, rack table 83, guide 84, pinion gear 85, motor 86, and origin detector 87.

Holder 81 integrally holds rotary shafts 62a and 63a of separation and retard rollers 62 and 63. Pinion gear 82 is mounted on holder 81 and engages with a top surface of rack table 83. Rack table 83 is fixed to guide 84. Guide 84 is engaged with pinion gear 85. Motor 86 is controlled by control unit 10 and rotates pinion gear 85. Origin detector 87 detects whether or not rack table 83 is positioned at a basic position in the original document width direction (horizontal direction in FIGS. 10A to 10C) by detecting whether or not origin detector 87 is in contact with lever 83a mounted on rack table 83.

Once pinion gear 85 rotates, guide 84 and rack table 83, in turn, move in the original document width direction. Once rack table 83 moves in the original document width direction, pinion gear 82 and holder 81 rotate in turn. As a result, rotary shafts 62a and 63a of separation and retard rollers 62 and 63 rotate in a clockwise direction or a counterclockwise direction in FIGS. 10A to 10C with a center portion between separation and retard rollers 62 and 63 as a hinged support. That is, control unit 10 can control the rotation amounts (rotation angles) of rotary shafts 62a and 63a of separation and retard rollers 62 and 63 by controlling the rotation amounts of motor 86 and pinion gear 85 in turn.

Origin detector 87 detects whether or not the rotation positions of rotary shafts 62a and 63a are at basic positions by detecting whether or not origin detector 87 is in contact with lever 83a mounted on rack table 83.

FIG. 10A illustrates the appearance in which original document P is transported in a state of being skewed and the passing of the leading end of original document P is detected by first original document detectors 67a, 67b, 67c, 67d, and 67e. In this stage, the rotation positions of rotary shafts 62a and 63a of separation and retard rollers 62 and 63 are positioned at the basic positions. Origin detector 87 detects that origin detector 87 is in contact with lever 83a mounted on rack table 83 and notifies control unit 10 of the fact that the rotation positions of rotary shafts 62a and 63a are positioned at the basic positions.

FIG. 10B illustrates the appearance in which control unit 10 changes (specifically, decreases the transporting speed of left skew roller 64a and increases the transporting speed of right skew roller 64b) the transporting speeds of left skew roller 64a and right skew roller 64b to correct the skew state of the original document based on the detection results of first original document detectors 67a, 67b, 67c, 67d, and 67e. At this time, as a transporting speed difference between left skew roller 64a and right skew roller 64b occurs, load F is generated in the original document width direction (right direction in FIG. 10B) in response to the counterclockwise rotation of original document P. At that time, control unit 10 rotates rotary shafts 62a and 63a of separation and retard rollers 62 and 63 in accordance with a rotation direction (counterclockwise direction in FIG. 10B) of original document P by controlling motor 86. Control unit 10 sets the rotation angles of rotary shafts 62a and 63a according to the correction amount (rotation angle) of the skew of original document P and continues the rotation of rotary shafts 62a and 63a until the correction of the skew is terminated. Origin detector 87 detects that origin detector 87 is not in contact with lever 83a mounted on rack table 83 and notifies control unit 10 of the fact that the rotation positions of rotary shafts 62a and 63a are not positioned at the basic positions. Due to the rotation of rotary shafts 62a and 63a, rotational load of original document P when correcting the skew of original document P can be decreased and skew correction performance can be improved. In addition, original document P is prevented from being creased in response to the rotation of original document P when correcting the skew of original document P. The rotational load of original document P when correcting the skew of original document P may be decreased by incorporating the configuration illustrated in FIGS. 8A to 8C into a configuration illustrated in FIGS. 10A to 10C.

FIG. 10C illustrates appearance after the correction of the skew of original document P is terminated and the trailing end of original document P has passed first original document detectors 67a, 67b, 67c, 67d, and 67e. At this time, control unit 10 rotates rotary shafts 62a and 63a of separation and retard rollers 62 and 63 in the clockwise direction in FIG. 10C by controlling motor 86 until origin detector 87 detects that the rotation positions of rotary shafts 62a and 63a are positioned at the basic positions.

FIG. 11 is a timing chart of each parameter at a time of the skew correction described with reference to FIGS. 10A to 10C. As illustrated in FIG. 11, the transporting speeds of left skew roller 64a and right skew roller 64b are changed from the timing (time t1) at which second original document detector 69 detects passing of original document P and the rotation positions of rotary shafts 62a and 63a of separation and retard rollers 62 and 63 change in accordance with the rotation direction (counterclockwise direction: CCW in FIG. 11) of original document P. After then, the rotation positions of rotary shafts 62a and 63a of separation and retard rollers 62 and 63 change in a direction (clockwise direction: CW in FIG. 11) opposite to the rotation direction of original document P from the timing (time t2) immediately before the trailing end of original document P passes first original document detectors 67a, 67b, 67c, 67d, and 67e.

Figure 12:
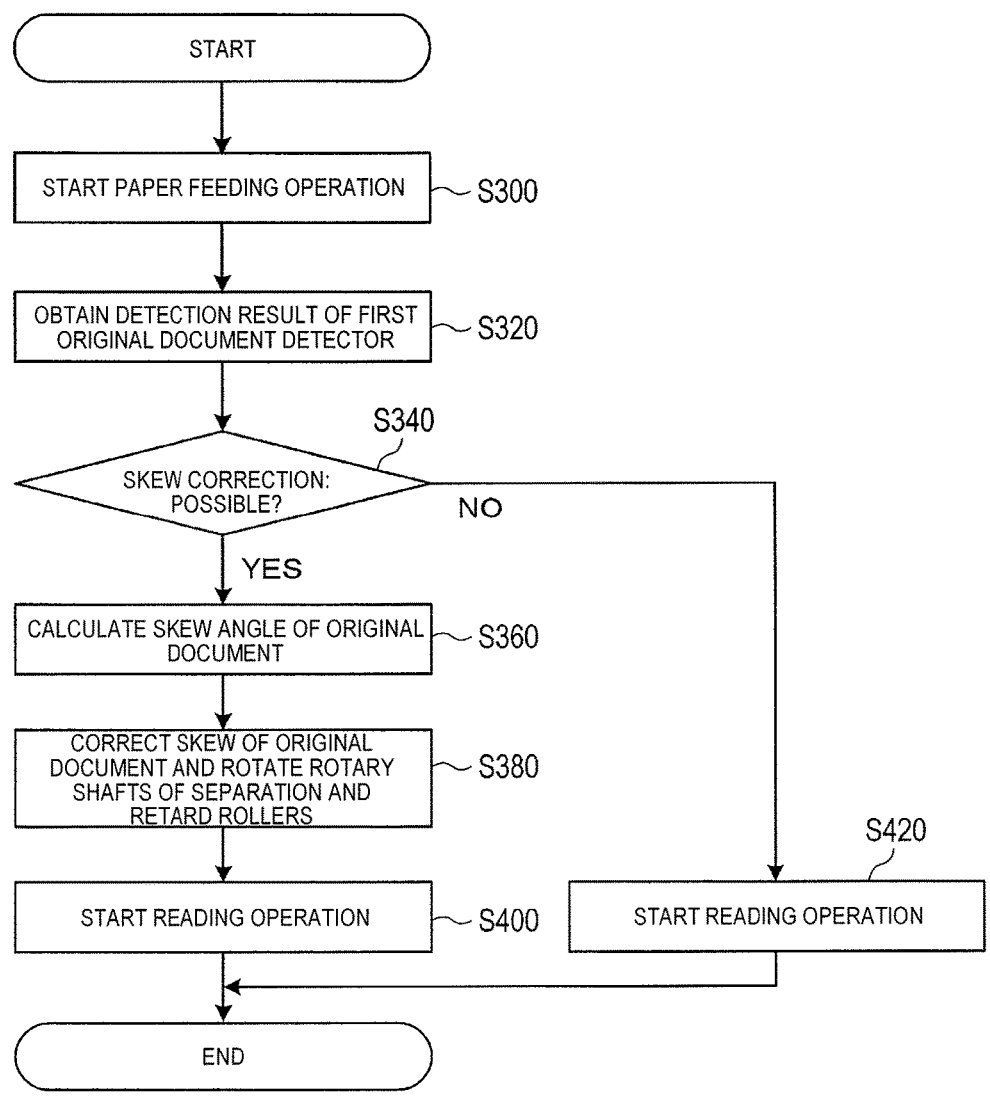
FIG. 12 is a flow chart showing the skew correction control operation in the exemplary embodiment.

FIG. 12 is a flow chart showing skew correction control operation of image reading apparatus 1 having the configuration illustrated in FIGS. 10A to 10C. Since processing of Steps S300, S320, S340, S360, S400, and S420 in FIG. 12 is the same as processing of Steps S100, S120, S140, S160, S200, and S220 in FIG. 7, description thereof will be omitted.

In Step S380, control unit 10 corrects the skew of the original document by making the transporting speeds of left skew roller 64a and right skew roller 64b different from each other according to the skew angle calculated in Step S360 and rotates rotary shafts 62a and 63a of separation and retard rollers 62 and 63, by controlling motor 86, in accordance with the rotation direction of original document P in response to the correction.

Figure 13:
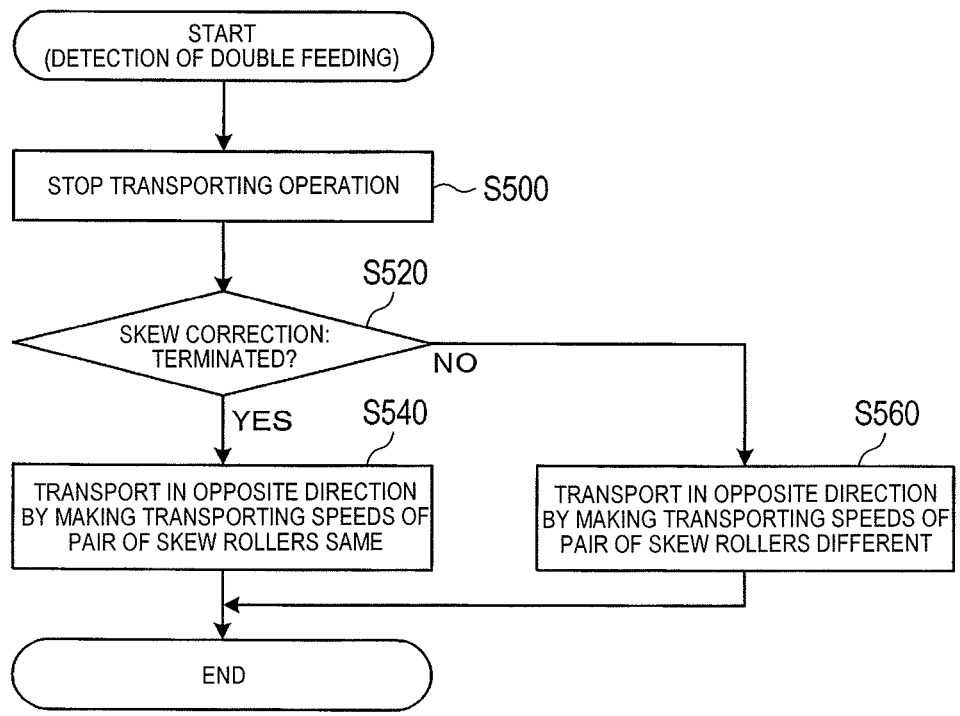
FIG. 13 is a flow chart showing the skew correction control operation in the exemplary embodiment.

In addition, in the exemplary embodiment, in a case where double feeding detector 68 detects double feeding of an original document when correcting the skew of the original document, the pair of skew rollers 64 may be controlled and the original document may be transported in the direction opposite to the transporting direction of original document according to a correction condition of the skew. FIG. 13 is a flow chart showing skew correction control operation of image reading apparatus 1 in this modification example. Processing of Step S500 in FIG. 13 starts by double feeding detector 68 detecting double feeding of an original document when correcting the skew of the original document.

First, control unit 10 controls transporter 60 (separation and retard rollers 62 and 63 and the pair of skew rollers 64) to stop transporting operation of original document P (Step S500). Next, control unit 10 determines whether or not the skew correction of the original document is terminated according to whether or not passing of the leading end of original document P is detected by third original document detector 70 (Step S520).

In a case where the skew correction of original document P is turned out to be terminated as a result of determination (Step S520, YES), control unit 10 controls transporter 60 (separation and retard rollers 62 and 63 and the pair of skew rollers 64) to transport original document P in the direction opposite to the transporting direction of original document P until the leading end of original document P passes first original document detectors 67a, 67b, 67c, 67d, and 67e without making the transporting speeds of left skew roller 64a and right skew roller 64b different from each other (Step S540). After then, control unit 10 controls transporter 60 (separation and retard rollers 62 and 63 and the pair of skew rollers 64) to start the transporting operation in the transporting direction of original document P. By completing processing of Step S540, image reading apparatus 1 terminates processing of FIG. 13.

On the other hand, in a case where the skew correction of original document P is not terminated (Step S520, NO), control unit 10 controls transporter 60 (separation and retard rollers 62 and 63 and the pair of skew rollers 64) to transport original document P in the direction opposite to the transporting direction until the leading end of original document P passes first original document detectors 67a, 67b, 67c, 67d, and 67e while accurately correcting the skew of original document P by making the transporting speeds of left skew roller 64a and right skew roller 64b different from each other. More specifically, control unit 10 corrects the skew of original document P, a portion on which the skew correction is not finished at a time point of Step S500, while transporting original document P. After then, control unit 10 controls transporter 60 (separation and retard rollers 62 and 63 and the pair of skew rollers 64) to start the transporting operation in the transporting direction of original document P. By completing processing of Step S560, image reading apparatus 1 terminates processing of FIG. 13.

In addition, the exemplary embodiment described above is merely a specific example for implementing the disclosure and the technical scope of the disclosure should not be interpreted to be limited to the exemplary embodiment. That is, the disclosure can be implemented in various forms without departing from the spirit or the main characteristics thereof.

What is claimed is:

1. An image reading apparatus of that transports an original document loaded on an original document loaded stand through an original document transport path and reads an image formed on the original document, the apparatus image reading comprising:
   a pair of a plurality of transport rollers that is disposed at an interval in an original document width direction, which is orthogonal to a transporting direction of the original document, and transports the original document with the original document being pinched therebetween;
   a plurality of original document detectors that is disposed at an interval in the original document width direction on an upstream side of the pair of the plurality of transport rollers in the transporting direction and detects passing of the original document;
   a controller that determines whether or not correcting skew of the original document is possible based on detection results of the plurality of original document detectors; and
   the controller that controls the pair of the plurality of transport rollers and corrects the skew of the original document by making transporting speeds of the pair of the plurality of transport rollers different from each other, in a case where correcting of the skew of the original document is possible,
   wherein there are three or more of the original document detectors, and
   the controller determines that correcting the skew of the original document is possible in a case where three or more adjacent original document detectors detect the passing of the original document in order of being disposed in the original document width direction and the original document is pinched between the pair of the plurality of transport rollers, based on the detection results of the original document detectors and determines that correcting the skew of the original document is impossible in a case where the passing of the original document is not detected in order of being disposed in the original document width direction or the original document is not pinched between the pair of the plurality of transport rollers.

2. An image reading apparatus that transports an original document loaded on an original document loaded stand through an original document transport path and reads an image formed on the original document, the image reading apparatus comprising:
   a pair of a plurality of transport rollers that is disposed at an interval in an original document width direction, which is orthogonal to a transporting direction of the original document, and transports the original document with the original document being pinched therebetween;
   a plurality of original document detectors that is disposed at an interval in the original document width direction on an upstream side of the pair of the plurality of transport rollers in the transporting direction and detects passing of the original document;
   a controller that determines whether or not correcting skew of the original document is possible based on detection results of the plurality of original document detectors;
   the controller that controls the pair of the plurality of transport rollers and corrects the skew of the original document by making transporting speeds of the pair of the plurality of transport rollers different from each other, in a case where correcting of the skew of the original document is possible; and
   an image reader that is disposed on a downstream side of the pair of the plurality of transport rollers in the transporting direction and reads the image formed on the original document,
   wherein the controller corrects the image read by the image reader without correcting the skew of the original document in a case where correcting the skew of the original document is impossible.

3. An image reading apparatus that transports an original document loaded on an original document loaded stand through an original document transport path and reads an image formed on the original document, the image reading apparatus comprising:
- a pair of a plurality of transport rollers that is disposed at an interval in an original document width direction, which is orthogonal to a transporting direction of the original document, and transports the original document with the original document being pinched therebetween;
- a plurality of original document detectors that is disposed at an interval in the original document width direction on an upstream side of the pair of the plurality of transport rollers in the transporting direction and detects passing of the original document;
- a pair of second transport rollers that is disposed on an upstream side of the plurality of original document detectors in the transporting direction and transports the original document with the original document being pinched therebetween;
- a rotator that rotates rotary shafts of the pair of second transport rollers, which configure the pair of second transport rollers;
- a controller that determines whether or not correcting skew of the original document is possible according to detection results of the plurality of original document detectors; and
- the controller that controls the pair of the plurality of transport rollers, controls the rotator while correcting the skew of the original document by making transporting speeds of the pair of the plurality of transport rollers different from each other, and rotates the rotary shafts of the pair of second transport rollers such that a load, which is applied to the original document in response to an operation of correcting the skew of the original document, decreases, in a case where correcting the skew of the original document is possible.

4. The image reading apparatus of claim 3,
wherein there are three or more of the original document detectors, and
the controller determines that correcting the skew of the original document is possible in a case where three or more adjacent original document detectors detect passing of the original document in order of being disposed in the original document width direction and the original document is pinched between the pair of the plurality of transport rollers, based on the detection results of the original document detectors and determines that correcting the skew of the original document is impossible in a case where the passing of the original document is not detected in order of being disposed in the original document width direction or the original document is not pinched between the pair of the plurality of transport rollers.

5. The image reading apparatus of claim 3, further comprising:
an image reader that is disposed on a downstream side of the pair of the plurality of transport rollers in the transporting direction and reads the image formed on the original document;
wherein the controller corrects the image read by the image reader without correcting the skew of the original document in a case where correcting the skew of the original document is impossible.

6. An image reading apparatus that transports an original document loaded on an original document loaded stand through an original document transport path and reads an image formed on the original document, the image reading apparatus comprising:
- a pair of a plurality of transport rollers that is disposed at an interval in an original document width direction, which is orthogonal to a transporting direction of the original document, and transports the original document with the original document being pinched therebetween;
- a plurality of original document detectors that is disposed at an interval in the original document width direction on an upstream side of the pair of the plurality of transport rollers in the transporting direction and detects passing of the original document;
- a double feeding detector that is disposed on an upstream side of the pair of the plurality of transport rollers in the transporting direction and detects double feeding of the original document;
- a controller that determines whether or not correcting skew of the original document is possible according to detection results of the plurality of original document detectors; and
- the controller that controls the pair of the plurality of transport rollers, corrects the skew of the original document by making transporting speeds of the pair of the plurality of transport rollers different from each other, controls the pair of the plurality of transport rollers according to a correction condition of the skew when the double feeding detector detects double feeding of the original document at a time of correction, and transports the original document in a direction opposite to the transporting direction, in a case where correcting the skew of the original document is possible.

7. The image reading apparatus of claim 6,
wherein the controller transports the original document in the direction opposite to the transporting direction without making the transporting speeds of the pair of the plurality of transport rollers different from each other when correction of the skew is terminated in a case where the double feeding detector detects the double feeding of the original document.

8. The image reading apparatus of claim 6,
wherein the controller transports the original document in the direction opposite to the transporting direction while correcting the skew of the original document by making the transporting speeds of the pair of the plurality of transport rollers different from each other when correction of the skew is not terminated in a case where the double feeding detector detects the double feeding of the original document.

9. The image reading apparatus of claim 6,
wherein there are three or more of the original document detectors, and
the controller determines that correcting the skew of the original document is possible in a case where three or more adjacent original document detectors detect passing of the original document in order of being disposed in the original document width direction and the original document is pinched between the pair of the plurality of transport rollers, based on the detection results of the original document detectors and determines that correcting the skew of the original document is impossible in a case where the passing of the original document is not detected in order of being disposed in the original document width direction or the original document is not pinched between the pair of the plurality of transport rollers.

10. The image reading apparatus of claim 6, further comprising:
 an image reader that is disposed on a downstream side of the pair of the plurality of transport rollers in the transporting direction and reads the image formed on the original document;
 wherein the controller corrects the image read by the image reader without correcting the skew of the original document in a case where correcting the skew of the original document is impossible.

* * * * *